UNITED STATES PATENT OFFICE.

CURT JULIUS ROEHR, OF PHILADELPHIA, PENNSYLVANIA, ASSIGNOR TO HIMSELF AND WILLIAM F. PARRY, OF PHILADELPHIA, PENNSYLVANIA.

TREATING DISTILLERY-SLOP.

No. 820,824.          Specification of Letters Patent.          Patented May 15, 1906.

Application filed January 9, 1905. Serial No. 240,355.

*To all whom it may concern:*

Be it known that I, CURT JULIUS ROEHR, a subject of the Emperor of Germany, and a resident of Philadelphia, Pennsylvania, have invented certain Improvements in Treating Distillery-Slop, of which the following is a specification.

The object of my invention is to provide a practicable method of recovering from brewers' or distillers' slop the protein and fatty matters contained therein, which may be used as animal feed and in all technical processes where casein or other forms of protein have been employed.

Brewers' or distillers' slop consists of a thick liquid containing as valuable ingredients the shells of the grain, fatty matters, and protein in solution or emulsion.

Heretofore attempts have been made to separate the protein and fatty matter by filtering the slop in ordinary filter-presses; but such methods can only recover those small portions of the protein and fat which adhere to the shells, for the finely-distributed protein and fatty matters accumulating upon the filter-cloth will, owing to their water-repellent properties, prevent the passage of water through the pores of the cloth, so that the filtering operation is arrested before a solid cake of the residue can be obtained. This is true whether the slop is filtered in its natural state or after neutralization with lime or other alkaline matter. To overcome this objection, I treat the slop prior to the filtering operation with an alkaline solution of mineral matter which is soluble in alkali, but insoluble in water, such alkaline solution being added to the sour slop preferably while the same is hot.

As a way of carrying out my invention, which has proved effective in practice, I may state that I have added to two thousand pounds of slop heated to a temperature of about two hundred (200°) degrees Fahrenheit a solution of ten pounds of silicate of soda in twelve and one-half gallons of water. The effect of this treatment is twofold, the chemical reaction between the lactic acid of the slop and the alkali freeing from the latter the mineral matter and also freeing from the acid the protein held in solution or distribution therein both the protein and the mineral matter being precipitated and the protein being deposited upon said mineral matter in such manner that it will no longer interfere with proper filtering action. Under these conditions it will be understood that the precipitate contains silicic acid, protein, fat, and fibrous material, while the solution contains dextrose, glucose, maltose, &c., and glycerin, so that the solids may be easily filtered from said solution without any of the difficulties hitherto found prohibitive when it was attempted to separate brewers' slop into its liquid and solid constituents. I am thus enabled to obtain the nutrients, the fat, protein, &c., separate from the industrial products—viz., glycerin, dextrose, glucose, &c.—and may utilize these two classes of substances accordingly.

Mineral matters insoluble in water but soluble in alkali are, for instance, silicic acid, hydroxid of aluminium, copper, zinc, nickel, cobalt, silver, &c., very good results being obtained by using a solution of silicate of soda in water, which effects a quick precipitation of the protein and other matters contained in the slop, the process having the further advantage of being very cheap, because of the low cost of the silicate, experiments having shown that one-half pound of silicate of soda is sufficient to properly treat one hundred pounds of slop.

To still further reduce the cost of the process, partial neutralization of the slop may be effected before the treatment of the same in the manner before described, a cheap and simple method of effecting such partial neutralization being the use of any cheap metal or hydroxid or oxid of metal soluble in lactic acid but insoluble in water. For instance, the slop may be caused to flow in the first instance over or through iron scraps, whereby the action of the iron or iron oxid will effect a partial neutralization of the slop.

The strength of the alkaline solution may vary, depending upon the character of the slop under treatment; but as an instance of a solution which I have found to be effective for the purpose I may mention one containing ten pounds of silicate of soda dissolved in twelve and one-half gallons of water.

I do not in this application claim the process of recovering glycerin, dextrine, or the like and lactic acid from brewers' or distillers' slop as herein disclosed, since this forms the subject-matter of my copending application, Serial No. 249,935, filed March 13, 1905.

Having thus described my invention, I claim and desire to secure by Letters Patent—

1. The within-described improvement in treating distillers' slop, same consisting of subjecting the same while maintained in a heated condition to the action of an alkaline solution of mineral matter to effect precipitation of the protein contents of the slop, which said mineral matter is not soluble in water, substantially as specified.

2. The mode herein described of treating distillers' slop, said mode consisting in first subjecting the same while maintained in a heated condition to the action of mineral matter in alkaline solution to effect precipitation of the protein contents of the slop, which said mineral matter is not soluble in water, and then filtering the latter, substantially as specified.

3. The mode herein described of treating distillers' slop, said mode consisting in subjecting the same while maintained in a heated condition to the action of a solution in water of silicate of soda, substantially as specified.

4. The mode herein described of treating distillers' slop, said mode consisting in effecting partial neutralization of the same and then causing precipitation of the protein contents of the slop by the action thereupon while maintained in a heated condition of mineral matter in alkaline solution, which said mineral matter is not soluble in water, substantially as specified.

In testimony whereof I have signed my name to this specification in the presence of two subscribing witnesses.

CURT JULIUS ROEHR.

Witnesses:
WM. E. SHUPE,
WALTER CHISM.